United States Patent Office 3,114,754
Patented Dec. 17, 1963

3,114,754
AZO, ANTHRAQUINONE, NITRO, AND PHTHALO-CYANINE DYESTUFFS HAVING BETA-ACYL-OXYETHYL SULPHONYL OR AN N-(BETA-ACYL-OXYETHYL) SULFAMYL RADICAL
Frank Lodge and Cyril Eric Vellins, Blackley, Manchester, England, assignors to Imperial Chemical Industries Limited, London, England, a corporation of Great Britain
No Drawing. Filed Oct. 3, 1960, Ser. No. 59,852
Claims priority, application Great Britain Oct. 12, 1959
6 Claims. (Cl. 260—372)

This invention relates to new dyestuffs. More particularly the invention relates to new water-soluble dyestuffs capable of entering into reaction with textile materials containing active hydrogen atoms such as natural and regenerated cellulose, wool, silk, and synthetic polyamide fibres.

According to the invention there are provided dyestuffs which are rendered water-soluble by the presence of sulphonic acid or carboxylic acid groups and which contain, attached to a carbon atom of the dyestuff, a group of the formula:

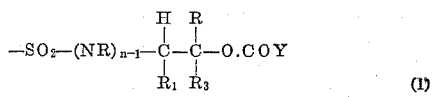

(1)

wherein

R stands for a hydrogen atom or an alkyl, substituted alkyl, aryl or substituted aryl group, a cycloalkyl or an aralkyl radical, $R_1$, $R_2$ and $R_3$ may stand independently for hydrogen or for lower alkyl groups, $n$ stands for 1 or 2, and —COY stands for the radical of a monobasic carboxylic acid.

As examples of alkyl radicals which may be represented by R in the above formula, there may be mentioned in particular, lower alkyl radicals such as methyl, ethyl, propyl and butyl.

As examples of substituted alkyl radicals which may be represented by R in the above formula, there may be mentioned substituted lower alkyl radicals, preferably acyloxy-lower alkyl radicals in which the acyl group is identical with that represented by COY. Thus, where Y represents methyl, R may represent for example, β-acetoxyethyl, γ-acetoxypropyl or β:γ-diacetoxypropyl.

As examples of aryl radicals which may be represented by R in the above formula there may be mentioned monocyclic hydrocarbon radicals such as phenyl and tolyl and as examples of substituted aryl radicals which may be represented by R in the above formula, there may be mentioned radicals of the benzene series such as chlorophenyl.

As examples of cycloalkyl radicals there may be mentioned cyclohexyl and as examples of aralkyl radicals there may be mentioned benzyl.

As examples of lower alkyl groups which may be represented by $R_1$, $R_2$ and $R_3$ in the above formula there may be mentioned methyl and ethyl.

As examples of radicals of monobasic carboxylic acids represented by CO.Y in the above formula, there may be mentioned those in which Y represents, for example hydrocarbon radicals, for example, alkyl radicals such as methyl, ethyl, n-propyl and isopropyl, alkenyl radicals such as vinyl and α- and β-methylvinyl, cycloalkyl radicals such as cyclohexyl, aralkyl radicals such as benzyl and naphthylmethyl, aryl radicals such as phenyl and tolyl and substituted hydrocarbon radicals for example halogeno-lower alkyl such as chlormethyl, dichloromethyl, trichloromethyl and β-dichloropropyl, acyl-lower alkyl such as acetylmethyl and radicals of the benzene series such as methoxyphenyl, nitrophenyl and chlorophenyl.

The grouping of Formula 1 above is attached to a carbon atom of the dyestuff. This atom may, for example, form part of aromatic carbocyclic or heterocyclic nucleus or may itself be attached to an aromatic nucleus of the dyestuff either directly or by a chain of atoms (which need not all be carbon atoms) and which may form part of a non-aromatic ring. The said carbon atom preferably forms part of a benzene nucleus, which may or may not itself form part of a polycyclic nucleus. Thus, in the anthraquinone or phthalocyanine series the said carbon atom may be one of the α-carbon atoms of the anthraquinone nucleus or one of the 3- or 4-carbon atoms of a phthalocyanine nucleus, or in the same two series may be one of the carbon atoms of a benzene ring pendant to one of these nuclei as in a tetraphenyl phthalocyanine, a phenyl sulphamyl phthalocyanine or an α-anilinoanthraquinone.

The new dyestuffs include dyestuffs of any of the known water-soluble species. Thus, as well as members of the anthraquinone and phthalocyanine series as mentioned above, the new dyestuffs include members of the nitro and triphendioxazine series and, preferably, members of the azo series, including mono- and polyazo dyes.

The dyestuffs may be metal-free or may contain metals; for example copper, nickel, cobalt or chromium may be present in complex formation in members of the azo or phthalocyanine series.

As a further feature of the invention there is provided a process for manufacture of the new dyestuffs of the invention which comprises treating with a monobasic carboxylic acid of the formula $Y.CO_2H$ or a derivative thereof which may be used as an acylating agent such as the anhydride or acid halide of such an acid, a dyestuff which is rendered water-soluble by presence of a sulphonic acid or carboxylic acid group and which contains, attached to a carbon atom of the dyestuff, a group of the formula:

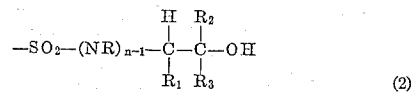

(2)

wherein R, $R_1$, $R_2$, $R_3$ and $n$ have the meanings given above.

As examples of monobasic organic carboxylic acids of formula $Y.CO_2H$ there may be mentioned acetic acid, propionic acid, butyric acid, acrylic acid, methacrylic acid, crotonic acid, benzoic acid, chloroacetic acid, methoxybenzoic acid, nitrobenzoic acid, chlorobenzoic acid, phenyl acetic acid, toluic acid, cyclohexanecarboxylic acid, dichloroacetic acid, trichloroacetic acid, β-chloropropionic acid and acetoacetic acid.

The dyestuffs which contain the group of Formula 2 above may be obtained by a number of methods. For example, where $n=1$ in the formula, suitable dyestuffs may be obtained by converting a dyestuff containing one or more sulphonchloride groups into the corresponding sulphinic acid, or the alkali metal salt of such an acid, and then reacting this product with β-chloroethyl alcohol or ethylene oxide. In this manner compounds containing the group:

are obtained. If, instead of β-chloroethyl alcohol or ethylene oxide, compounds containing the appropriate lower alkyl substituents are used, such as β-chloropropanol, propylene oxide, 1:2-butylene oxide or lower alkyl derivatives thereof, products are obtained containing the grouping:

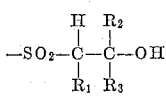

Starting materials of this kind can also be obtained by subjecting to oxidation, a dyestuff containing the grouping:

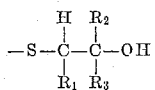

or

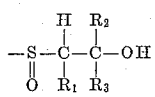

Where the symbol $n$ of Formula 2 stands for 2, the dyestuffs used as starting materials in the process of the invention may be obtained by reacting a dyestuff containing one or more sulphonchloride groups with a β-hydroxyalkylamine such as ethanolamine, N-methyl-, N-ethyl-, N-propyl- and N-butyl ethanolamine, N-phenyl-, N-tolyl-, N-(chlorphenyl)-, N-cyclohexyl- and N-benzyl-ethanolamines, diethanolamine, N - (β:γ - dihydroxypropyl)ethanolamine and γ-hydroxy-propyl-β-hydroxyethylamine.

Dyestuffs for use as starting materials in the above process of the invention may also be obtained by formation from intermediate compounds which may or may not themselves be coloured and which already contain the group of Formula 2 above. In the case of azo dyestuffs, the said group may be present once or several times in the diazo component or in the coupling component, or in both components; if necessary, the product obtained is treated with an agent yielding metal to give a complex metal containing azo dyestuff. As examples of such agents, there may be mentioned copper, manganese, nickel, zinc and vanadyl sulphates, chromium, cobalt and ferric chlorides, cuprammonium sulphate, chromium acetate, cobalt tartrate and chromium salicylate.

As examples of diazo components containing a group of Formula 2 above, there may be mentioned p-β-hydroxyethylsulphonylaniline,
2-amino-4-β-hydroxyethylsulphonylphenol,
5-β-hydroxyethylsulphonylaniline-2-sulphonic acid,
5-β-hydroxyethyl-sulphamyl-aniline-2-sulphonic acid,
2-amino-4-β-hydroxyethylsulphamylphenol,
2-amino-4-(N-β-hydroxyethyl-N-methylsulphamyl)-phenol,
2-amino-4-(N-β-hydroxyethyl-N-ethylsulphamyl)-phenol,
2-amino-4-(N-β-hydroxyethyl-N-propylsulphamyl)-phenol,
2-amino-5-β-hydroxyethylsulphonylphenol,
2-amino-5-(N-β-hydroxyethyl-N-ethylsulphamyl)phenol,
4-(β-hydroxyethylsulphonyl)-anthranilic acid,
2-chlor-5-β-hydroxyethylsulphonylaniline,
2-amino-4-(N-β-hydroxyethyl-N-phenylsulphamyl)-phenol,
2-amino-4-(N-β-hydroxyethyl-N-2'-chlorphenylsulphamyl)-phenol,
m- and p-aminobenzenesulphon-N-β-hydroxyethylamide,
p-aminobenzenesulphon-N-(α:β-dimethyl-β-hydroxyethyl)-amide,
p-aminobenzenesulphon-N-(α-methyl-β-hydroxyethyl)-amide,
4-amino-3-chlorbenzenesulphon-N-β-hydroxyethylamide,
2-amino-5-nitrobenzenesulphon-N-β-hydroxyethylamide,
4-amino-3-chlorophenyl-β-hydroxyethylsulphone,
4-amino-1-naphthyl-β-hydroxyethylsulphone and
3-β-hydroxyethylsulphonylmethyl-4-methylaniline.

These diazo components may be coupled with coupling components which do not contain a group of Formula 2, for example para coupling amines of the benzene or naphthalene series such as 4-sulpho-1:3-phenylenediamine,
N:N-dimethylaniline,
N:N-diethylaniline,
N:N-diethyl-m-toluidine,
N-ethyl-N-β-hydroxyethylaniline,
N:N-di-(β-hydroxyethyl)-m-toluidine,
N-ethyl-N-β-cyanoethylaniline,
N-β-hydroxyethyl-N-β'-cyanoethylaniline,
N:N-di-(β-acetoxyethylaniline),
N:N-di-(β-carboethoxyethyl)aniline,
N-β-cyanoethyl-N-β-methoxyethylaniline,
3-N:N-di(β-acetoxyethyl)aminoacetanilide,
N-β-hydroxyethylaniline and
N-β-hydroxyethyl-1-naphthylamine, other ortho-coupling amines such as 1-naphthylamine-4-sulphonamide,
2-naphthylamine-6-sulphonamide and
4-chlor-1-naphthylamine, phenols such as
1-phenol-4-sulphonic acid,
p-cresol,
3:4- or 2:4-dimethylphenol,
2- or 3-acetylamino-4-methylphenol,
t-butylphenol,
4-thiocyanophenol,
4-sulphamyl-phenol,
4-acetylphenol,
2-hydroxy-5:6:7:8-tetrahydronaphthalene,
2-hydroxy-3-sulphamyl-5:6:7:8-tetrahydronaphthalene,
4-methoxyphenol,
2-carboethoxyamino-4-methylphenol,
o- and p-phenylphenol,
2-hydroxydiphenyleneoxide and
2:4-dihydroxyquinoline,
naphthols and naphtholsulphonic acids such as
  2-naphthol,
1-acetylamino,
1-propionylamino,
1-benzenesulphonylamino-,
1-carboisopropoxyamino- and
1-phenylamino-7-naphthols,
6-acetyl-2-naphthol,
4-acetyl-1-naphthol,
1-naphthol-3-, 4- or 5-sulphonamide,
2-naphthol-3-, 4-, 5-, 6-, 7- or 8-sulphonamide,
5:8-dichlor-1-naphthol,
5-chloro-1-naphthol,
1:5-dihydroxynaphthalene,
1-acetylamino-4-, 5- or 6-naphthol and
2-acetylamino-7-naphthol,
1-naphthol-4-, and -5-sulphonic acids,
2-naphthol-6-, -7- and -8-sulphonic acids,
1-naphthol-3:6- and 3:8-disulphonic acids,
2-naphthol-3:6- and
6:8-disulphonic acids,
1-naphthol-3:6:8-trisulphonic acid,
1:8-dihydroxynaphthalene-3:6-disulphonic acid,
2-acetylamino-5-naphthol-7-sulphonic acid,
2-acetylamino-8-naphthol-6-sulphonic acid and
1-acetylamino-8-naphthol-3:6- and
4:6-disulphonic acids, aminonaphthols and
amino-naphthol sulphonic acids such as
1:8-aminonaphthol-6-sulphonic acid,
1:8-aminonaphthol-3:6- and 4:6-disulphonic acids,
2:5-aminonaphthol-7-sulphonic acid,
2:8-aminonaphthol-6-sulphonic acid,
2:5-aminonaphthol-1:7-disulphonic acid,
2:8-aminonaphthol-3:6-disulphonic acid,
1-amino-6-naphthol-3-, -4- and -8-sulphonic acids
and their lower N-alkyl derivatives as
1-butylamino-8-naphthol-3:6-disulphonic acid and
2-methylamino-5-naphthol-7-sulphonic acid and their N-aryl derivatives such as
1-phenyl-amino-8-naphthol-3:6-disulphonic acid;
ketomethylene compounds such as
1-(2'-methoxyphenyl)-3-methyl-5-pyrazolone,
1-phenyl-3-methyl-5-pyrazolone,
1-(2'-, 3'- or 4'-methylphenyl)-3-methyl-5-pyrazolone,
1-(2'-, 3'- or 4'-chlorphenyl)-3-methyl-5-pyrazolone,
1-(2'-, 3'- or 4'-nitrophenyl)-3-methyl-5-pyrazolone,
1-(2':5'- or 3':4'-dichlorophenyl)-3-methyl-5-pyrazolone,
1-(2'-, 3'- or 4'-sulphamylphenyl)-3-methyl-5-pyrazolone,
3-methyl-5-pyrazolone,
1-(2'-, 3'- or 4'-methylsulphonylphenyl)-3-methyl-5-pyrazolone,
1-phenyl-5-pyrazolone-3-carboxycresidide,
1-phenyl-5-pyrazolone-3-carboxy-2'-toluidide,
1-phenyl-5-pyrazolone-3-carboxyanilide,
1:3-diphenyl-5-pyrazolone,
1-(2'-, 3'- or 4'-N-methylsulphamylphenyl)-3-methyl-5-pyrazolone,
1-(2'-, 3'- or 4'-N:N-diethylsulphamylphenyl)-3-methyl-5-pyrazolone,
acetoacetanilide,
acetoacet-o-anisidide, and
acetoacetanilide-4-sulphonamide,
1-(4'-sulphophenyl)-3-methyl-5-pyrazolone,
1-(6'-chloro-3'-methyl-4'-sulphophenyl)-3-methyl-5-pyrazolone,
1-(2':5'-dichloro-4'-sulphophenyl)-3-methyl-5-pyrazolone,
1-(2'-methyl-5'-sulphophenyl)-3-methyl-5-pyrazolone,
1-(2'-chloro-5'-sulphophenyl)-3-methyl-5-pyrazolone,
1-(4'-chloro-2'-sulphophenyl)-3-methyl-5-pyrazolone,
1-(2'-chloro-4'-methyl-5'-sulphophenyl)-3-methyl-5-pyrazolone,
1-(6'-chloro-4'-sulpho-2'-methylphenyl)-3-carboethoxy-5-pyrazolone,
1-(6'-chloro-4'-sulpho-2'-methylphenyl)-3-methyl-5-pyrazolone,
1-(4'-methyl-2'-sulphophenyl)-3-methyl-5-pyrazolone,
1-(2':5'-disulphophenyl)-3-methyl-5-pyrazolone,
1-(4'-ethoxy-2'-sulphophenyl)-3-methyl-5-pyrazolone,
1-(2':4'-dichloro-5'-sulphophenyl)-3-methyl-5-pyrazolone,
1-(6'-chloro-3'-sulpho-2'-methylphenyl)-3-methyl-5-pyrazolone,
1-(4'-sulphophenyl)-3-carboxy-5-pyrazolone,
1-(3':5'-disulphophenyl)-3-methyl-5-pyrazolone,
1-(4'-carboxyphenyl)-3-methyl-5-pyrazolone,
1-(3'-carboxyphenyl)-3-methyl-5-pyrazolone,
1-(2'-carboxyphenyl)-3-methyl-5-pyrazolone,
1-phenyl-3-carboxy-5-pyrazolone,
1-p-tolyl-3-carboxy-5-pyrazolone,
3-carboxy-5-pyrazolone.

As examples of coupling components which contain a group of Formula 2 there may be mentioned for example 6-β-hydroxyethylsulphonyl-2-naphthol-3-sulphonic acid,
2-naphthol-6-β-hydroxyethylsulphone,
1-naphthol-4-β-hydroxyethylsulphone,
1-(3' or 4'-β-hydroxyethylsulphonylphenyl)-3-methyl-5-pyrazolone,
m-(N:N-diethylamino)benzenesulphon-N-β-hydroxyethylamide,
m-(N:N-dimethylamino)-benzenesulphon-N-β-hydroxyethylamide,
m-(N:N-diethylamino)-phenyl-β-hydroxyethylsulphone,
1-(3'- or 4'-β-hydroxyethylsulphamoylphenyl)-3-methyl-5-pyrazolone,
2-naphthol-6-β-hydroxyethylsulphonamide,
2-naphthylamine-6-sulphon-β-hydroxyethylamide and
6-β-hydroxyethylsulphonyl-2-naphthylamine.

These coupling components may alternatively be coupled with diazo components which do not contain a group of Formula 2 for example diazotisable amines of the benzene series, for example aniline,
o-, m- and p-toluidines,
o-, m- and p-anisidines,
m- and p-nitroanilines,
m- and p-aminoacetanilides,
orthanilic acid,
metanilic acid,
sulphanilic acid,
aniline-2:4-, -2:5- and 3:5-disulphonic acids,
4-methylaniline-2-sulphonic acid,
5-methylaniline-2-sulphonic acid,
2-methylaniline-5-sulphonic aicd,
2:4-dimethylaniline-6-sulphonic acid,
4-methylaniline-2:5-, 3:5- and 2:6-disulphonic acids,
2-methylaniline-4:6-disulphonic acid,
5-chloro-2-aminoanisole,
4-methoxyaniline-2-sulphonic acid,
5-methoxy aniline-2-sulphonic acid,
2-methoxyaniline-5-sulphonic acid,
2:4-dimethoxyaniline-6-sulphonic acid,
4-chloroaniline-2-sulphonic acid,
4:5-dichloroaniline-2-sulphonic acid,
2:5-dichloroaniline-4-sulphonic acid,
4-acetylaminoaniline-2-sulphonic acid,
5-acetylaminoaniline-2-sulphonic acid,
2-trifluoromethylaniline,
5-trifluoromethylaniline-2-sulphonic acid,
4-chloro-5-methylaniline-2-sulphonic acid,
3-chloro-2-methylaniline-4:6,disulphonic acid,
5-chloro-4-methylaniline-2-sulphonic acid,
4-nitroaniline-2-sulphonic acid,
5-nitroaniline-2-sulphonic acid,
4-nitro-2-methoxyaniline-5-sulphonic acid,
5-amino-2-methylacetanilide-4-sulphonic acid,
aniline-2-, -3- and 4-carboxylic acids and esters of these such as methyl and butyl anthranilates,
2-aminophenol,
2-aminophenol-4-sulphonic acid,
2-aminophenol-4:6-disulphonic acid,
4-ethanesulphonyl-2-aminophenol,
3-amino-4-hydroxyacetophenone,
4-nitro-2-aminophenol-6-sulphonic acid,
6-nitro-2-aminophenol-4-sulphonic acid,
4-chloro-2-aminophenol-6-sulphonic acid,
6-chloro-2-aminophenol-4-sulphonic acid,
4- and 5-nitro-2-aminophenols,
4:6-dinitro-2-aminophenol,
4-, 5- or 6-chloro-2-aminophenol,
4-sulphamyl-2-aminophenol,
4-methylsulphamyl-2-aminophenol,
4- and 5-sulpho-2-aminobenzoic acids,
aminoterephthalic acid,
4-amino-iso-phthalic acid,
5-nitro-2-aminophenoxyacetic acid,
5-chloro-2-aminobenzoic acid,
5-nitro-2-aminobenzoic acid,
2-sulphamylaniline,
2-ethylsulphamylaniline,
2-aminophenylethylsulphone,
4- and 5-aminosalicylic acids;

Diazotisable amines of the naphthalene and other fused ring series such as 1- and 2-naphthylamines, 1-naphthylamine-4-, 5-, 6- and 7-monosulphonic acids,
2-naphthylamine-1, 6-, 7- and 8-monosulphonic acids,
1-naphthylamine-2:4, 2:5-, 3:6- and 3:8-disulphonic acids,
2-naphthylamine-1:5-, 3:6-, 4:8-, 5:7- and 6:8-disulphonic acids,
1-naphthylamine-2:4:6- and 2:5:7-trisulphonic acids,
2-naphthylamine-1:5:7- and 3:6:8-trisulphonic acids,
2-methoxy-1-naphthylamine-6- and -7-sulphonic acids,
1-amino-2-naphthol-4-sulphonic acid,
1-amino-6-nitro-2-naphthol-4-sulphonic acid,
1- and 2-aminoanthraquinones, 1-aminopyrene monosulphonic acid,
3-amino-chrysene-sulphonic acid;

Diazotisable amines containing more than one unfused phenyl ring such as 4-aminodiphenyl-3- and 4'-sulphonic acids,
4'-nitro-4-aminostilbene-2:2'-disulphonic acid,
4'-acetylamino-4-aminostilbene-2:2'-disulphonic acid,
4'-benzoylamino-4-aminostilbene-2:2'-disulphonic acid,
4'-chloro-4-aminostilbene-2:2'-disulphonic acid,
4'-bromo-4-aminostilbene-2:2'-disulphonic acid,
4'-dimethylamino-4-aminostilbene-2:2'-disulphonic acid,
4'-anilino-4-aminostilbene-2:2'-disulphonic acid,
2-amino-2'-methyldiphenyl ether,
2-amino-2'-methyldiphenylether-4'-sulphonic acid,
2-aminodiphenylsulphone,
4-aminodiphenylamine,
4-amino-4'-nitrodiphenylamine-2'-sulphonic acid,
3- and 4-aminobenzanilides, 3'- and 4'-aminobenzanilides,
3'- and 4'-aminobenzanilide-3- and -4-sulphonic acids;

And heterocyclic amine compounds such as 4-, 5- and 6-aminoindazoles, 6-amino-5-methoxy-2-(4'-sulphophenyl)benz-1:2:3-triazole, 6-methyl-2-(4'-aminophenyl)-benzthiazole, and its mono- and di-sulphonation products, 2-(4'-aminophenyl)naphtha-1:2:3-triazole-3':5-disulphonic acid, 2(3'- and 4'-aminophenyl)naphtha-1:2:3-triazole-4:7:9-trisulphonic acids, 2-(4'-aminophenyl)-naphtha-1:2:3-triazole-3':4:7:9-tetrasulphonic acid, 5-nitro-2-aminothiazole and 3-aminopyridine.

Anthraquinone dyestuffs which may be used as starting materials for the above process of the invention may be obtained, for example, by condensation of an anthraquinone carrying a halogen atom in an alpha position with an amine, preferably an aromatic amine, containing a group of Formula 2 above; thus, for example, 1-amino-4-bromoanthraquinone-2-sulphonic acid may be condensed with 3- or 4-β-hydroxyethylsulphonylaniline or a β-hydroxyethylsulphamylaniline.

Dyestuffs of the o-nitrodiphenylamine series which may be used as starting materials in the above process of the invention may also be obtained, for example, by condensing a o-halogeno-nitrobenzene with a primary aromatic amine of the benzene series, wherein one of the reactants contains a group of Formula 2 and the other contains a carboxylic acid or a sulphonic acid group. Thus 4-chloro-3-nitrophenyl-β-hydroxyethyl sulphone may be condensed with, for example, metanilic acid, m-aminobenzoic acid or nuclearly-substituted derivatives of these, or m-β-hydroxyethylsulphonylaniline may be condensed for example with 4-chloro-3-nitrobenzoic acid or 4-chloro-3-nitrobenzene sulphonic acid.

Dyestuffs of the phthalocyanine series which may be used as starting materials in the above process of the invention may also be obtained, for example, by condensing an amine, preferably an aromatic amine, containing a group of Formula 2 above, with a phthalocyanine sulphonchloride.

It is to be understood, that in all these methods for obtaining dyestuffs suitable for use as starting materials for the above process of the invention, the intermediates are so chosen as to yield finally a dyestuff which contains one or more sulphonic acid or carboxylic acid groups.

The above process of the invention may be conveniently carried out by stirring the anhydride or acid halide of the acid of formula Y.COOH and the dyestuff containing at least one group of Formula 2 together in a liquid tertiary amine or in an organic liquid in the presence of a tertiary amine, preferably at a temperature between 0° and 50° C., and, when the reaction is complete, adding a liquid, such as water or diethylether or an aqueous solution of sodium chloride, which is a solvent for the tertiary amine and/or the organic liquid but in which the dyestuff is insoluble, and filtering off the dyestuff which is precipitated.

As examples of anhydrides or acid halides which may be used in the above process of the invention there may be mentioned acetic anhydride, acetyl chloride, acetyl bromide, propionyl chloride, butyryl chloride, α-chloroacetyl chloride, benzoyl chloride, benzoyl bromide, methoxybenzoyl chloride, chlorobenzoyl chloride, β-chloropropionyl chloride, α-bromoacetyl bromide, acryloyl chloride, α-phenylacetyl chloride and nitrobenzoyl chloride.

The new dyestuffs of the invention may also be obtained by reacting together dyestuff intermediates which already contain the group of Formula 1, and which are so chosen as to give products containing sulphonic acid or carboxylic acid groups and this alternative process forms a further feature of the invention. These sulphonic acid or carboxylic acid groups may be present in the intermediate or may be formed, for example by hydrolysis of sulphonchloride or carbonyl chloride groups simultaneously with formation of the dyestuff.

For example azo dyestuffs containing at least one group of Formula 1 may be obtained by diazotising a primary aromatic amine, which may be an aminoazo compound, and coupling the diazo compound so obtained with a coupling component either the primary aromatic amine or the coupling component or both containing at least one group of Formula 1 and either the primary aromatic amine or the coupling component or both containing at least one sulphonic or carboxylic acid group.

The said primary aromatic amine is preferably a primary aromatic amine of the benzene or naphthalene series, which is optionally substituted by an arylazo radical, and which may or may not contain a group of Formula 1, as hereinbefore defined. Such primary aromatic amines containing a group of Formula 1 may be obtained by treating the corresponding nitro compounds containing a group of Formula 2 with an anhydride or acid halide of an acid of the formula Y.COOH, and subsequently reducing the nitro group to an amino group. Specific examples of primary aromatic amines containing a group of Formula 2 have already been disclosed in the specification.

The said coupling components may be members of any of the known series of coupling components but preferably they are coupling components of the acylacetarylide, 5-pyrazolone, phenol, naphthol or arylamine series which optionally contain a group of Formula 1. Such coupling components containing a group of Formula 1 may be obtained by treating the corresponding coupling components containing a group of Formula 2 with an anhydride or acid halide of an acid of formula Y.COOH. Specific examples of coupling components containing a group of Formula 2 have already been described in the specification. As specific examples of coupling components containing a group of Formula 1 there may be mentioned 4-β-acetoxyethylsulphonyl-1-naphthol and 6-β-acetoxyethylsulphonyl-2-naphthol-3-sulphonic acid.

Alternatively primary aromatic amines containing a group of Formula 1 attached directly or through a methylene group to an aryl nucleus present in the said amine can be condensed with dyestuffs or dyestuff intermediates containing reactive halogen atoms such as α-halogenated anthraquinone compounds, chlorosulphonated anthraquinones, o-chloronitrobenzenes and phthalocyanine sulphon- and carbonyl chlorides.

As examples of primary aromatic amines which may contain a group of Formula 1 attached directly or through methylene to an aryl nucleus present in the said amines, there may be mentioned 2-chloro-5-β-acetoxyethylsulphonyl aniline, 4-β-acetoxyethylsulphonylaniline, 3-β-acetoxyethylsulphonylaniline, 4-β-acetoxyethylsulphonylaniline, 3-(β-acetoxyethylsulphonylmethyl)-4-methylaniline, 2-methoxy-5-β-acetoxyethylsulphonylaniline, 5-β-acetoxyethylsulphonylaniline-2-sulphonic acid and 2-amino-4-β-acetoxyethylsulphonylphenol.

As examples of dyestuffs or dyestuff intermediates containing reactive halogen atoms which may be reacted with these primary aromatic amines there may be mentioned phthalocyanine-, especially copper phthalocyanine-, sulphonic acid-sulphonylchlorides, 4 - chloro - 3 - nitrobenzenesulphonic acid, α - halogenoanthraquinone sulphonic acids, such as 1-amino-4-bromoanthraquinone-2-sulphonic acid, 1 - amino-4 - bromoanthraquinone-2:5-, 2:6-, 2:7- and 2:8-disulphonic acids, 1-amino-2:4-dibromoanthraquinone-5-, 6-, 7- and 8-sulphonic acids, 1:4-bis(p-phenylanilino)anthraquinonetetrasulphonyl chloride and 4-chloro-3-nitrobenzoic acid.

A preferred class of the new dyestuffs, as hereinbefore defined, are those dyestuffs which contain at least one sulphonic acid or carboxylic acid group and which contain 1 or 2 groups of the formula:

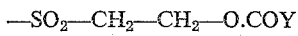

wherein Y has the meaning stated above. It is, however, preferred that Y represents a lower alkyl radical or a nonocyclic aryl radical.

The new dyestuffs, as hereinbefore defined, are valuable for colouring natural and artificial textile materials for example textile materials comprising cotton, viscose rayon, regenerated cellulose, wool, silk, cellulose acetate, polyamides, polyacrylonitrile, modified polyacrylonitrile, and aromatic polyester fibres. For this purpose the dyestuffs can be applied to the textile materials by dyeing, padding or printing using printing pastes containing the conventional thickening agents or oil-in-water emulsions or water-in-oil emulsions, whereby the textile materials are coloured in bright shades possessing excellent fastness to wet treatments such as washing. The new dyestuffs build-up well on textile materials to give heavy depths of shade.

The new dyestuffs are particularly valuable for colouring cellulose textile materials. For this purpose the dyestuffs are preferably applied to the cellulose textile material in conjunction with a treatment with an acid-binding agent, for example sodium carbonate, sodium metasilicate, trisodium phosphate or sodium hydroxide, which may be applied to the cellulose textile material before, during or after the application of the dyestuff. Alternatively when the dyed textile material is to be subsequently heated or steamed a substance such as sodium bicarbonate or sodium trichloroacetate, which on heating or steaming liberates an acid-binding agent can be used.

For example the cellulose textile material can be coloured by treating the cellulose textile material with an aqueous solution or suspension of the acid-binding agent and then immersing the so-treated cellulose textile material in a dyebath comprising a solution of one or more of the new dyestuffs, as hereinbefore defined, at a temperature of between 0° and 100° C., removing the dyed cellulose textile material from the dyebath and if desired subjecting the dyed cellulose textile material to a treatment in a hot aqueous solution of soap.

If desired the cellulose textile material which has been treated with an aqueous solution or suspension of the acid-binding agent may be passed between rollers to remove excess aqueous solution or suspension of the acid-binding agent and/or dried before being treated with the aqueous solution of the said dyestuffs.

Alternatively the aqueous solution of the dyestuff may be applied by padding to the cellulose textile material which has been treated with the acid-binding agent and the cellulose textile material then passed through rollers and subsequently subjected to the action of heat or steam. Alternatively the cellulose textile material can be padded with an aqueous solution of one or more of the new dyestuffs, as hereinbefore defined, which also contains an acid-binding agent, passing the so-treated cellulose textile material through rollers, then if desired drying the cellulose textile material at a suitable temperature, for example 70° C., and then subjecting the cellulose textile material to the action of heat or steam. Alternatively the cellulose textile material can be dyed by immersing it in a dyebath comprising an aqueous solution of the one or more of the said dyestuffs which also contains an acid-binding agent, at a suitable temperature for example between 0° and 100° C., and thereafter removing the cellulose textile material from the dyebath, if desired subjecting it to a treatment in a hot aqueous solution of soap and finally drying the dyed cellulose textile material. Alternatively the aqueous solution of the one or more of the said dyestuffs can be applied to the cellulose textile material by a dyeing or a padding method and the coloured cellulose textile material subsequently immersed in an aqueous solution or suspension of the acid-binding agent, preferably at a temperature between 50° C. and 100° C., or alternatively the coloured cellulose textile material may be padded with an aqueous solution or suspension of the acid-binding agent, the textile material dried and then subjected to the action of heat or steam. Alternatively the cellulose textile material can be dyed by immersing it in a dyebath comprising an aqueous solution of one or more of the said dyestuffs, preferably at a temperature between 20° and 100° C., and, after the textile material has absorbed some or all of the dyestuffs, adding an acid-binding agent and proceeding with the dyeing at the same or a different temperature.

The concentration of the acid-binding agent present in the aqueous solution or suspension of the acid-binding agent or in the aqueous solution of the dyestuff is not critical but it is preferred to use between 0.1% and 10% of the acid-binding agent based on the total weight of the aqueous solution or suspension. If desired the aqueous solution or suspension of the acid-binding agent may also contain further substances, for example electrolytes such as sodium chloride and sodium sulphate.

The aqueous solution of the said dyestuffs may also contain substances which are known to assist the application of dyestuffs to textile materials, for example sodium chloride, sodium sulphate, urea, dispersing agents, surface-active agents, sodium alignate or an emulsion of an organic liquid, for example trichloroethylene in water.

Alternatively the cellulose textile materials can be printed with a printing paste containing one or more of the new dyestuffs of the invention.

This may be conveniently brought about by applying a printing paste containing one or more of the said dyestuffs, to a cellulose textile material which has been impregnated with an acid-binding agent and thereafter subjecting the printed cellulose textile material to the action of heat or steam. Alternatively a printing paste containing one or more of the said dyestuffs and containing an acid-binding agent can be applied to the cellulose textile material and the printed cellulose textile material subsequently subjected to the action of heat or steam. Alternatively a printing paste containing one or more of the said dyestuffs can be applied to the cellulose textile material which is subsequently immersed in a hot aqueous solution or suspension of the acid-binding agent or alternatively the printed textile material is impregnated with an aqueous solution or suspension of the acid-binding agent and subsequently subjected to the action of heat or steam.

After applying the printing paste to the cellulose textile material the printed textile material may, if desired, be dried, for example at a temperature between 20° and 100° C., before the printed textile material is subjected to the action of heat or steam.

The cellulose textile material may be printed with the printing paste by any of the commonly known methods of applying printing pastes to textile materials, for example by means of roller printing, screen printing, block printing, spray printing or stencil printing. The printing pastes may also contain the commonly used adjuvants, for example urea, thickening agents, for example methyl cellulose, starch, locust bean gum, sodium alginate, water-in-oil emulsions, oil-in-water emulsions, surface-active agents, sodium m-nitrobenzene sulphonate, and organic liquids, for example ethanol.

At the conclusion of the dyeing and/or printing processes it is preferred to subject the so-coloured cellulose textile materials to a "soaping" treatment, which may be carried out by immersing the coloured cellulose textile materials for a short time, for example 15 minutes, in a hot aqueous solution of soap and/or detergent, and subsequently rinsing the coloured cellulose textile material in water before drying it.

The new dyestuffs, as hereinbefore defined, are also valuable for colouring nitrogen-containing textile materials such as wool and polyamide textile materials, and for colouring such textile materials it is preferred to apply the dyestuffs from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.7 to 7.5 or higher if desired. The dye bath may also contain substances which are commonly used in the dyeing of nitrogen-containing textile materials. As examples of such substances there may be mentioned ammonium acetate, sodium sulphate, ethyl tartrate, nonionic dispersing agents such as condensates of ethylene oxide with amines, fatty alcohols or phenols, surface-active cationic agents such as quaternary ammonium salts for example cetyl trimethylammonium bromide and cetyl pyridinium bromide and organic liquids such as n-butanol and benzyl alcohol.

When so applied to textile materials the new dyestuffs, as hereinbefore defined, are believed to react with hydroxy and/or amino groups present in the said textile materials whereby the dyestuffs become attached to the textile materials by chemical bonds, this belief being based on the resistance of the resulting colourations to severe washing treatments and also to solvent extraction treatments.

hours and 100 parts of sodium chloride are added. The dyestuff which is precipitated is filtered off, washed with a 10% aqueous solution of salt and finally dried. It dyes cellulose in orange shades.

The 2-chloro-5-β-acetoxyethylsulphonylaniline used in the above example may be obtained by reacting 1-chloro-2-nitro-4-β-hydroxyethylsulphonylbenzene with acetic anhydride in pyridine, adding water, isolating the precipitated 1 - chloro-2-nitro-4-β-acetoxyethylsulphonylbenzene and reducing the nitro group to an amino group by treating an ethanol solution of the nitro compound with hydrogen in the presence of a Raney nickel catalyst.

*Example 2*

12 parts of 1-amino-4-(3'-β-hydroxyethylsulphonylanilino)anthraquinone-2-sulphonic acid are dissolved in 60 parts of dry pyridine. The solution is cooled to 0° C. and 7.6 parts of acetic anhydride are added. The mixture is stirred for 4 hours at from 0° to 4° C., then filtered. The product on the filter is stirred in diethyl ether, then refiltered and washed with diethyl ether and dried.

The product obtained is the pyridine salt of 1-amino-4 - (3'-β-acetoxyethylsulphonylanilino)anthraquinone-2-sulphonic acid. It may be obtained in the form of the sodium salt by dissolving in hot water, adding sodium bicarbonate until the solution is alkaline, and then adding sodium chloride, whereupon the dyestuff is precipitated as the sodium salt.

It dyes cellulose in bright reddish-blue shades.

The following table gives further examples of the new dyestuffs of the invention which are obtained when the 27.75 parts of 2-chloro-5-β-acetoxyethylsulphonylaniline used in Example 1 are replaced by equivalent amounts of the amines listed in the second columns of the table, and/or the 21.12 parts of 2-naphthol-6-sulphonic acid are replaced by equivalent amounts of the coupling components listed in the third column of the table. The fourth column of the table indicates the shades obtained when the dyestuffs are applied to textile materials.

| Example | Amine | Coupling Component | Shade |
| --- | --- | --- | --- |
| 3 | 2-methoxy-5-β-acetoxyethylsulphonylaniline | 1-(2'-methyl-4'-sulpho-6'-chlorophenyl)-3-methyl-5-pyrazolone | Greenish-yellow. |
| 4 | 2-methoxy-5-β-benzoyloxyethylsulphonylaniline | 1-amino-8-naphthol-3:6-disulphonic acid | Reddish-violet. |
| 5 | 2-methoxy-5-β-acetoxyethylsulphonylaniline | 2-N-acetylamino-5-naphthol-7-sulphonic acid | Orange. |
| 6 | do | 1-naphthol-5-sulphonic acid | Red. |
| 7 | do | 1-N-phenylamino-8-naphthol-3:6-disulphonic acid | Greyish-brown. |
| 8 | do | 2-N-phenylamino-5-naphthol-7-sulphonic acid | Red. |
| 9 | do | 1-(3'-amino-4'-sulphophenyl)-5-pyrazolone-3-carboxylic acid | Yellow. |
| 10 | do | 1-(2'-methyl-5'-sulphophenyl)-3-methyl-5-pyrazolone | Do. |
| 11 | do | 1-(3'-methyl-4'-sulpho-6'-chlorophenyl)-3-methyl-5-pyrazolone | Do. |
| 12 | do | 1-phenyl-5-pyrazolone-3-carboxylic acid | Do. |
| 13 | do | 1-(3'-nitrophenyl)-5-pyrazolone-3-carboxylic acid | Do. |
| 14 | do | 1-(2'-methyl-3'-sulpho-6'-chlorophenyl)-3-methyl-5-pyrazolone | Do. |
| 15 | do | 1-(2'-chloro-5'-sulphophenyl)-3-methyl-5-pyrazolone | Do. |
| 16 | do | 1-(2'-methyl-4'-sulpho-6'-chlorophenyl)-3-carboethoxy-5-pyrazolone. | Do. |
| 17 | 2-methoxy-5-β-benzoyloxyethylsulphonylaniline | 2-naphthol-3?6-disulphonic acid | Red. |
| 18 | do | 1-(2'-methyl-4'-sulpho-6'-chlorophenyl)-3-methyl-5-pyrazolone | Yellow. |
| 19 | 2-chloro-5-β-acetoxyethylsulphonylaniline | 1-naphthol-5-sulphonic acid | Bluish-red. |
| 20 | do | 2-N-acetylamino-5-naphthol-7-sulphonic acid | Orange. |
| 21 | do | 1-(3'sulphophenyl)-3-methyl-5-pyrazolone | Yellow. |

The invention is illustrated but not limited by the following examples in which the parts and percentages are by weight:

*Example 1*

27.75 parts of 2-chlor-5-β-acetoxyethylsulphonylaniline are dissolved in a mixture of 25 parts of a concentrated aqueous solution of hydrochloric acid and 500 parts of water. The solution is cooled to 2° C. and a solution of 6.9 parts of sodium nitrite in 60 parts of water is added with stirring. The mixture is stirred for 15 minutes and sodium bicarbonate is added until the mixture is no longer acid to Congo Red. The diazo solution so obtained is added with stirring to a solution of 21.12 parts of 2-naphthol-6-sulphonic acid, 4.4 parts of sodium hydroxide and 20 parts of sodium carbonate in 200 parts of water which has been cooled to 2° C. The mixture is stirred for 4

*Example 22*

46.5 parts of the monosodium salt of 1-(2'-methoxy-5' - β-hydroxyethylsulphonylphenylazo)-2-naphthylamine-6-sulphonic acid (which is obtained by coupling diazotised 2-methoxy-5-β-hydroxyethylsulphonylaniline with 2-naphthylamine-6-sulphonic acid under acid conditions) are stirred in 460 parts of pyridine at a temperature of 20° C., and 30 parts of acetic anhydride are gradually added, the temperature of the mixture being maintained at 20° C. by external cooling. The resulting mixture is stirred for 16 hours at 20° C., 1000 parts of water are added, and the precipitated dyestuff is filtered off, washed with benzene and dried. When applied to wool from a slightly acid dyebath the dyestuff yields bright orange shades possessing excellent fastness to wet treatments.

The following table gives further examples of the new dyestuffs of the invention which are obtained when the 46.5 parts of the monosodium salt of the azo compound used in Example 22 are replaced by equivalent amounts of the sodium salts of the azo compounds which are obtained by diazotising the amine listed in the second column of the table and coupling the diazo compounds so obtained with the coupling components listed in the third column of the table under acid or alkaline conditions as indicated in the fourth column of the table, and/or the 30 parts of acetic anhydride used in Example 22 are replaced by equivalent amounts of the acylating agents listed in the fifth column of the table. The sixth column of the table indicates the shades obtained when the dyestuffs are applied to textile materials.

The copper complex used in the above example may be obtained by coupling diazotised 2-aminophenol-4-β-hydroxyethyl-sulphone with 1-naphthol-4-sulphonic acid in alkaline medium, and subsequently heating the resulting azo compound with an aqueous solution of copper acetate.

The following table gives further examples of the new dyestuffs of the invention which are obtained when the 53.1 parts of the copper complex used in Example 50 are replaced by equivalent amounts of the metal complexes which are obtained by diazotising the amine listed in the second column of the table, coupling with the coupling component listed in the third column of the table and sub-

| Example | Amine | Coupling Component | Coupling Conditions | Acylating agent | Shade |
|---|---|---|---|---|---|
| 23 | 2-methoxy-5-β-hydroxy-ethylsulfonylaniline | 1-(2'-methyl-4'-sulpho-6'-chlorophenyl)-3-methyl-5-pyrazolone | Alkaline | Acetic anhydride | Yellow. |
| 24 | ...do... | 1-naphthol-4-sulphonic acid | ...do... | ...do... | Red. |
| 25 | ...do... | 1-(2':5'-dichloro-4'-sulphophenyl)-3-methyl-5-pyrazolone | ...do... | ...do... | Yellow. |
| 26 | ...do... | 2-naphthol-6-sulphonic acid | ...do... | ...do... | Orange. |
| 27 | ...do... | 2-naphthol-7-sulphonic acid | ...do... | ...do... | Reddish-orange. |
| 28 | ...do... | ...do... | ...do... | Acetyl chloride | Do. |
| 29 | ...do... | 1-naphthol-5-sulphonic acid | ...do... | Acetic anhydride | Red. |
| 30 | ...do... | 2-amino-5-naphthol-7-sulphonic acid | ...do... | ...do... | Orange. |
| 31 | ...do... | 1-(3'-sulphophenyl)-3-methyl-5-pyrazolone | ...do... | ...do... | Yellow. |
| 32 | ...do... | 2-amino-8-naphthol-6-sulphonic acid | Acid | ...do... | Red. |
| 33 | ...do... | m-Phenylenediaminesulphonic acid | ...do... | ...do... | Yellow. |
| 34 | ...do... | 2-N-methylamino-8-naphthol-6-sulphonic acid. | Alkaline | ...do... | Brown. |
| 35 | ...do... | 2-N-acetylamino-5-naphthol-7-sulphonic acid. | ...do... | ...do... | Orange. |
| 36 | ...do... | m-Phenylenediaminesulphonic acid | Acid | Propionyl chloride. | Yellow. |
| 37 | ...do... | 2-N-methylamino-8-naphthol-6-sulphonic acid. | Alkaline | Benzoyl chloride | Red. |
| 38 | ...do... | 6-β-hydroxyethylsulphonyl-2-naphthol-x-sulphonic acid. | ...do... | Acetic anhydride | Reddish-orange. |
| 39 | o-Anisidine | ...do... | ...do... | ...do... | Red. |
| 40 | Aniline 4-sulphon-N-(β-hydroxyethyl)-amide. | 1-naphthol-4-sulphonic acid | ...do... | Butyryl chloride | Reddish-orange. |
| 41 | ...do... | 2-amino-8-naphthol-6-sulphonic acid | Acid | Acetic anhydride | Do. |
| 42 | Aniline 4-sulphon-N:N-di(β-hydroxyethyl)amide. | 1-naphthol-4-sulphonic acid | Alkaline | ...do... | Do. |
| 43 | 4-β-hydroxyethylsulphonylaniline | ...do... | ...do... | ...do... | Orange. |
| 44 | ...do... | 1-(3'-sulphophenyl)-3-methyl-5-pyrazolone. | ...do... | ...do... | Yellow. |
| 45 | ...do... | 2-amino-8-naphthol-6-sulphonic acid | Acid | ...do... | Red. |
| 46 | 4-β-hydroxyethylsulphonylaniline 2:6-disulphonic acid. | 1-phenyl-3-methyl-5-pyrazolone | Alkaline | ...do... | Yellow |
| 47 | p-Nitroaniline | 6-β-hydroxyethylsulphonyl-2-naphthol-x-sulphonic acid. | ...do... | ...do... | Orange. |
| 48 | 2-naphthylamine-6-sulphonic acid | 1-(3'-β-hydroxyethylsulphonylphenyl)-3-methyl-5-pyrazolone. | ...do... | ...do... | Do. |
| 49 | Orthanilic acid | 2-naphthylamine-6-β-hydroxyethyl-sulphone. | Acid | ...do... | Do. |

*Example 50*

53.1 parts of the copper complex of 2-(2'-hydroxy-5'-β-hydroxyethylsulphonylphenylazo)-1-naphthol-4-sulphonic acid are stirred in 500 parts of pyridine at a temperature of 20° C., and 30 parts of acetic anhydride are gradually added, the temperature of the mixture being maintained at 20° C. by external cooling. The mixture is then stirred for 16 hours at 20° C., 1000 parts of diethyl ether are added and the precipitated dyestuff is filtered off, washed with a 10% aqueous solution of sodium chloride and dried.

When applied to cellulose textile materials in conjunction with a treatment with an acid-binding agent the dyestuff yields red shades possessing very good fastness to washing and to light.

sequently treating the resulting azo compound with a metallising agent of the metal listed in the fourth column of the table, and/or the 30 parts of acetic anhydride used in Example 50 are replaced by equivalent amounts of the acylating agents listed in the fifth column of the table. The sixth column of the table indicates the shades obtained when the dyestuffs are applied to textile materials.

| Example | Amine | Coupling Component | Metal | Acylating Agent | Shade |
|---|---|---|---|---|---|
| 51 | 2-aminophenol-4-β-hydroxyethyl-sulphone. | 2-amino-5-naphthol-7-sulphonic acid | Copper | Acetic anhydride | Rubine. |
| 52 | ...do... | ...do... | ...do... | Benzoyl chloride | Do. |
| 53 | ...do... | 1-(2':5'-dichloro-4'-sulphophenyl)-3-methyl-5-pyrazolone | ...do... | Acetic anhydride | Yellow. |
| 54 | ...do... | 1-naphthol-4-sulphonic acid | ...do... | Acryloyl chloride | Red. |
| 55 | ...do... | 2-naphthol-6-sulphonic acid | ...do... | Acetic anhydride | Do. |
| 56 | ...do... | 1-(2':5'-dichloro-4'-sulphophenyl)-3-methyl-5-pyrazolone | Chromium | ...do... | Orange. |
| 57 | ...do... | ...do... | Cobalt | ...do... | Yellow. |
| 58 | 2-aminophenol-4-sulphon-N-ethyl-N-β-hydroxyethylsulphonamide. | 1-(4'-sulphophenyl)-3-methyl-5-pyrazolone | Copper | ...do... | Do. |
| 59 | 2-aminophenol-4-sulphon-N:N-di(β-hydroxyethyl)sulphonamide. | 1-(2'-chloro-5'-sulphophenyl)-3-methyl-5-pyrazolone. | ...do... | ...do... | Do. |

*Example 60*

A solution of 28.9 parts of 2-methoxy-5-β-acetoxy-ethylsulphonylaniline in a mixture of 25 parts of a concentrated aqueous solution of hydrochloric acid and 500 parts of water is cooled at 2° C. and a solution of 6.9 parts of sodium nitrite in 60 parts of water is added with stirring. The mixture is stirred for 15 minutes, the excess nitrous acid is then removed by the addition of sulphamic acid and the mixture is then added to a suspension of 24.5 parts of 2-naphthylamine-6-sulphonic acid in 500 parts of water. Sodium acetate is then added until the mixture is no longer acid to Congo red and the mixture is then stirred for 16 hours at 5° C. The precipitated solid is then filtered off and the solid so obtained is stirred in 750 parts of water and sodium carbonate is added until the mixture is alkaline. 75 parts of sodium chloride are then added and the precipitated dyestuff is filtered off and dried.

When applied to cellulose textile materials in conjunction with a treatment with an acid-binding agent the dyestuff yields orange shades possessing very good fastness to wet treatments.

In place of the 28.9 parts of 2-methoxy-5-$\beta$-acetoxyethylsulphonylaniline used in the above example there are used 27.75 parts of 2-chloro-5-$\beta$-acetoxyethylsulphonylaniline and/or in place of the 24.5 parts of 2-naphthylamine-6-sulphonic acid used in the above example there are used 26.1 parts of 2-amino-8-naphthol-6-sulphonic acid when similar dyestuffs are obtained.

*Example 61*

A solution of 1.4 parts of sodium nitrite in 10 parts of water is added to a solution of 6.6 parts 2-methoxy-5-$\beta$-acetoxyethylsulphonylaniline in a mixture of 100 parts of water and 3 parts of a concentrated aqueous solution of hydrochloric acid at a temperature of 0° C., and the resulting mixture is stirred for 15 minutes. Sulphamic acid is then added to destroy any excess nitrous acid which is present. The resulting solution is then added to a solution of 8.5 parts of 1-amino-8-naphthol-3:6-disulphonic acid in 100 parts of water and the mixture is then stored for 3 hours at 5° C. The precipitated monazo compound is then filtered off, the resulting solid is stirred in 200 parts of water and a 2 N aqueous solution of sodium hydroxide is added until the mixture is alkaline to Brilliant Yellow. To the resulting solution there is added a solution of diazotised 2-methoxy-5-$\beta$-acetoxyethylsulphonylaniline, which is obtained as described in the first sentence of this example, and the mixture is stirred for 16 hours at 5° C., sodium carbonate being added to maintain the mixture alkaline to Brilliant Yellow. 35 parts of sodium chloride are then added and the precipitated dyestuff is filtered off, washed with a 5% aqueous solution of sodium chloride and dried.

When applied to cellulose textile materials in conjunction with a treatment with an acid-binding agent the dyestuff yields navy-blue shades possessing excellent fastness to wet treatments.

*Example 62*

A mixture of 27 parts of 3-nitro-4-chlorobenzene-$\beta$-hydroxyethylsulphone, 21.5 parts of metanilic acid, 30 parts of calcium carbonate, 100 parts of ethyl alcohol and 200 parts of water is stirred at the boil under a reflux condenser for 17 hours and the mixture is then filtered. The resulting filtrate is cooled to 15° C. and the precipitated solid is filtered off, washed with ethyl alcohol and dried. The resulting solid is dissolved in 300 parts of pyridine at a temperature of 20° C., 20 parts of acetic anhydride are added and the mixture is stirred for 17 hours at 20° C. The mixture is then distilled under reduced pressure to remove the pyridine and the residue is stirred with diethyl ether. The precipitated dyestuff is then filtered off, washed with ether and dried.

When applied to cellulose textile materials in conjunction with a treatment with an acid-binding agent the dye-stuff yields yellow shades possessing very good fastness to wet treatments.

*Example 63*

A mixture of 13 parts of 3-nitro-4-chlorobenzene-sulphon-N-($\beta$-hydroxyethyl)amide, 8.5 parts of metanilic acid, 13 parts of calcium carbonate, 45 parts of ethyl alcohol and 100 parts of water is stirred at the boil under a reflux condenser for 25 hours. The mixture is then filtered and the resulting filtrate is evaporated to dryness. The residual solid is dissolved in 100 parts of ethanol, 30 parts of potassium acetate are added and the precipitated solid is filtered off and dried. The resulting solid is dissolved in 300 parts of pyridine, 22 parts of acetic anhydride are added and the mixture is stirred for 5 hours at 25° C. The resulting mixture on standing separates into 2 layers, and the lower layer is separated and added to 500 parts of a light petroleum ether (which boils between 40° and 60° C.). The resulting solid is then filtered off, stirred with acetone and ether added. The precipitated dyestuff is then filtered off and dried.

The following table gives further examples of the new dyestuffs of the invention which are obtained when the 12 parts of 1-amino-4-(3'-$\beta$-hydroxyethylsulphonylanilino)anthraquinone-2-sulphonic acid used in Example 2 are replaced by equivalent amounts of the anthraquinone compounds listed in the second column of the table, and/or the 7.6 parts of acetic anhydride used in Example 2 are replaced by equivalent amounts of the acylating agents listed in the third column of the table. The fourth column of the table indicates the shades obtained when the dyestuffs are applied to textile materials.

| Example | Anthraquinone compound | Acylating agent | Shade |
|---|---|---|---|
| 64 | 1-amino-4-(3'-$\beta$-hydroxyethylsulphonylanilino)anthraquinone-2-sulphonic acid. | Propionic anhydride | Reddish-blue. |
| 65 | ----do---- | Benzoyl chloride | Do. |
| 66 | 1-amino-4-[4'-methyl-3'-($\beta$-hydroxyethylsulphonylmethyl)-anilino]anthraquinone-2-sulphonic acid. | ----do---- | Blue. |
| 67 | ----do---- | Acetyl chloride | Do. |
| 68 | 1-amino-4-(4'-$\beta$-hydroxyethylsulphonylanilino)anthraquinone-2-sulphonic acid. | Acetic anhydride | Reddish-blue. |
| 69 | 1-amino-4-[3'-sulphon-N-$\beta$-hydroxyethylamido)anilino]anthraquinone-2-sulphonic acid. | ----do---- | Do. |
| 70 | 1-amino-4-[3'-(sulphon-N-x-ethyl-$\beta$-hydroxyethylamido)-anilino]anthraquinone-2-sulphonic acid. | ----do---- | Do. |

*Example 71*

14.4 parts of copper phthalocyanine are added to 163 parts of chlorosulphonic acid and the resulting mixture is stirred for 4 hours at 135° to 140° C. The mixture is then cooled to 10° C., poured into a mixture of ice and water and the precipitated chlorosulphonated copper phthalocyanine is filtered off and washed with water containing ice. The resulting solid is stirred with 120 parts of water and 120 parts of ice and a 10 N aqueous solution of sodium hydroxide is added until the mixture is neutral to Methyl Orange. A solution of 9.1 parts of m-aminobenzene-$\beta$-acetoxyethylsulphone in 100 parts of acetone and 16.8 parts of sodium bicarbonate are then added and the resulting mixture is stirred for 24 hours at a temperature between 20° and 25° C. 50 parts of sodium chloride are then added and the precipitated dyestuff is filtered off and dried.

When applied to cellulose textile materials in conjunction with a treatment with an acid-binding agent the dyestuff yields greenish-blue shades possessing excellent fastness to wet treatments.

In place of the 9.1 parts of m-aminobenzene-$\beta$-acetoxyethylsulphone used in the above example there are used 11.4 parts of m-aminobenzene-$\beta$-benzoyloxyethylsulphone or 12.5 parts of 3-($\beta$-benzoyloxyethylsulphonylmethyl)-4- methylaniline or 10.2 parts of 3-(β-acetoxyethylsulphonylmethyl)-4-methylaniline when similar dyestuffs are obtained.

*Example 72*

14.4 parts of copper phthalocyanine are added to 68 parts of chlorosulphonic acid and the resulting mixture is stirred for 3 hours at a temperature between 135° and 140° C. The mixture is then cooled to 95° C., 6.9 parts of phosphorus trichloride are added during 2 hours, and the mixture is then stirred for 2 hours at 100° C. The mixture is cooled to 10° C., poured into a mixture of ice and water, and the precipitated chlorosulphonated copper phthalocyanine is filtered off and washed with 125 parts of a 1% aqueous solution of hydrochloric acid. The resulting solid is stirred with 125 parts of water and 75 parts of ice and 6.1 parts of m-aminobenzene-β-acetoxyethylsulphone are added. A 2 N aqueous solution of ammonium hydroxide is then added until the pH of the mixture is 8 and the mixture is then heated to 40° C. and maintained at this temperature until no further additions of a 2 N aqueous solution of ammonium hydroxide are required to maintain the pH of the mixture at 8. An aqueous solution of hydrochloric acid is then added until the pH of the mixture is 7, 50 parts of sodium chloride are added and the precipitated dyestuff is filtered off and dried.

When applied to cellulose textile materials in conjunction with a treatment with an acid-binding agent the dyestuff yields greenish-blue shades possessing excellent fastness to wet treatments.

In place of the 6.1 parts of m-aminobenzene-β-acetoxyethylsulphone used in the above example there are used 11.4 parts of m-aminobenzene-β-benzoyloxyethylsulphone or 10.15 parts of 3-(β-acetoxyethylsulphonylmethyl)-4-methylaniline or 12.5 parts of 3-(β-benzoyloxyethylsulphonylmethyl)-4-methylaniline when similar dyestuffs are obtained.

*Example 73*

In place of the chlorosulphonated copper phthalocyanine used in Example 71 there is used an equivalent amount of the copper phthalocyanine tetrasulphonchloride which is obtained by the method described in Example 1 of British specification No. 515,637 whereby similar dyestuffs are obtained.

*Example 74*

In place of the chlorosulphonated copper phthalocyanine used in Example 72 there is used a chlorosulphonated copper phthalocyanine obtained by adding 24.7 parts of the tetrasodium salt of copper phthalocyanine tetra-4-sulphonic acid to 120 parts of chlorosulphonic acid, stirring the mixture for 3 hours at 120° C., cooling to 80° C., adding 12 parts of thionyl chloride, stirring the resulting mixture for 2 hours at 120° C., cooling to 20° C., pouring the mixture into ice and water and filtering off the precipitated chlorosulphonated copper phthalocyanine, whereby similar dyestuffs are obtained.

*Example 75*

20 parts of botany wool serge are immersed in a dyebath comprising a solution of 0.2 part of the dyestuff of Example 15 and 0.6 part of ammonium acetate in 1000 parts of water at a temperature of 40° C., and the dyebath is then heated to 100° C. during 30 minutes and maintained at 100° C. for 1 hour. The dyed wool serge is then removed from the dyebath, rinsed in water and dried.

The wool serge is dyed a greenish-yellow shade possessing good fastness to washing and to light.

*Example 76*

20 parts of botany wool slubbing are immersed in a dyebath comprising a solution of 0.2 part of the dyestuff of Example 2, 0.2 part of acetic acid and 2 parts of sodium sulphate in 1000 parts of water at a temperature of 40° C., and the dyebath is then heated to 100° C. during 30 minutes and maintained at this temperature for 1 hour. The dyed wool slubbing is then removed from the dyebath, rinsed in water and dried.

The wool slubbing is dyed a bright reddish-blue shade which has good fastness to washing and to light.

*Example 77*

100 parts of a bleached mercerised cotton cloth are padded through a solution of 10 parts of the dyestuff of Example 2 and 2 parts of a non-ionic wetting agent in 1000 parts of water at a temperature of 40° C., and the cotton cloth is then squeezed between rollers until its weight is 200 parts. The cotton cloth is dried at 70° C., and the cotton cloth is then passed through a solution of 10 parts of sodium hydroxide and 300 parts of sodium chloride in 1000 parts of water, squeezed between rollers and then steamed for 30 seconds at a temperature of 102° C. The dyed cotton cloth is then "soaped" for 5 minutes in a 0.5% aqueous solution of a synthetic detergent at a temperature of 95° C., rinsed in water and dried. The cotton cloth is coloured a bright reddish-blue shade possessing excellent fastness to light and to wet treatments.

*Example 78*

100 parts of a cotton poplin cloth are padded through a solution of 15 parts of the dye stuff of Example 26, 10 parts of sodium bicarbonate and 2 parts of a non-ionic wetting agent in 1000 parts of water at a temperature of 20° C., and the cotton cloth is then squeezed between rollers until its weight is 200 parts. The cotton cloth is dried at 70° C. and is then steamed at 102° C. for 1 minute. The cotton cloth is then "soaped" for 1 minute in a 0.5% aqueous solution of a non-ionic detergent at a temperature of 95° C., rinsed in water and finally dried. The cotton cloth is dyed an orange shade possessing excellent fastness to light and to wet treatments.

*Example 79*

5 parts of bleached cotton yarn are immersed in a dyebath comprising a solution of 0.1 part of the dyestuff of Example 51 and 4.5 parts of sodium chloride in 150 parts of water at a temperature of 60° C. and dyeing is carried out for 30 minutes at this temperature. 0.3 part of sodium hydroxide is then added and dyeing is continued for a further hour at the same temperature. The dyed cotton yarn is then removed from the dyebath, immersed for 5 minutes in a 0.3% aqueous solution of a non-ionic detergent at a temperature of 100° C., rinsed in water and finally dried. The cotton yarn is dyed a rubine shade which possesses excellent fastness to light and to wet treatments.

*Example 80*

100 parts of a plain weave cotton fabric are immersed in a solution of 5 parts of the dyestuff of Example 16, 10 parts of sodium bicarbonate, 200 parts of urea and 2 parts of a non-ionic wetting agent in 1000 parts of water at a temperature of 25° C., and the cotton cloth is then squeezed between rollers until its weight is 200 parts. The cotton cloth is then baked for 5 minutes at a temperature of 120° C. The coloured cotton cloth is then immersed for 1 minute in a 0.5% aqueous solution of a non-ionic detergent at a temperature of 95° C., rinsed in water and finally dried. The cotton cloth is coloured a yellow shade possessing excellent fastness to light and wet treatments.

What we claim is:

1. Water-soluble dyestuffs of the formula:

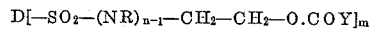

wherein

*m* stands for one of the members 1 and 2; and

D represents a dyestuff radical selected from the class consisting of azo, anthraquinone, nitro, and phthalocyanine dyestuff radicals which contain at least one water-solubilizing group selected from the class consisting of sulphonic acid and carboxylic acid groups;
R stands for a member selected from the class consisting of hydrogen atom, lower alkyl, and acetoxy lower alkyl radicals;
n stands for one of the members 1 and 2; and
Y is a radical selected from the class consisting of lower alkyl, vinyl, and phenyl radicals.

2. Water-soluble dyestuffs of the formula:

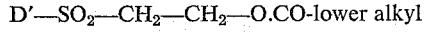

D'—SO$_2$—CH$_2$—CH$_2$—O.CO-lower alkyl wherein D' represents an anthraquinone radical containing at least one sulphonic acid group.

3. Sodium -1-amino-4-[3'-(β-acetoxyethylsuphonyl)anilino]-anthraquinone-2-sulphonate.

4. Sodium 1-amino-4-[3'-(β-benzoyloxyethylsulphonyl)anilino]-anthraquinone-2-sulphonate.

5. Sodium 1-amino-4-[3'-(β-propionyloxyethylsulphonyl)anilino]anthraquinone-2-sulphonate.

6. Sodium 1-amino-4-[4'-(β-acetoxyethylsulphonyl)anilino]anthraquinone-2-sulphonate.

References Cited in the file of this patent

UNITED STATES PATENTS

| | | |
|---|---|---|
| 2,139,472 | Schubert | Dec. 6, 1938 |
| 2,178,757 | Jordan et al. | Nov. 7, 1939 |
| 2,339,739 | Blackshaw et al. | Jan. 18, 1944 |
| 2,350,188 | Pinkey | May 30, 1944 |
| 2,424,493 | Muller et al. | July 22, 1947 |

OTHER REFERENCES

Colour Index, 2n ed., 1956, Society of Dyers and Colourists, vol. 1, page 1001.